UNITED STATES PATENT OFFICE.

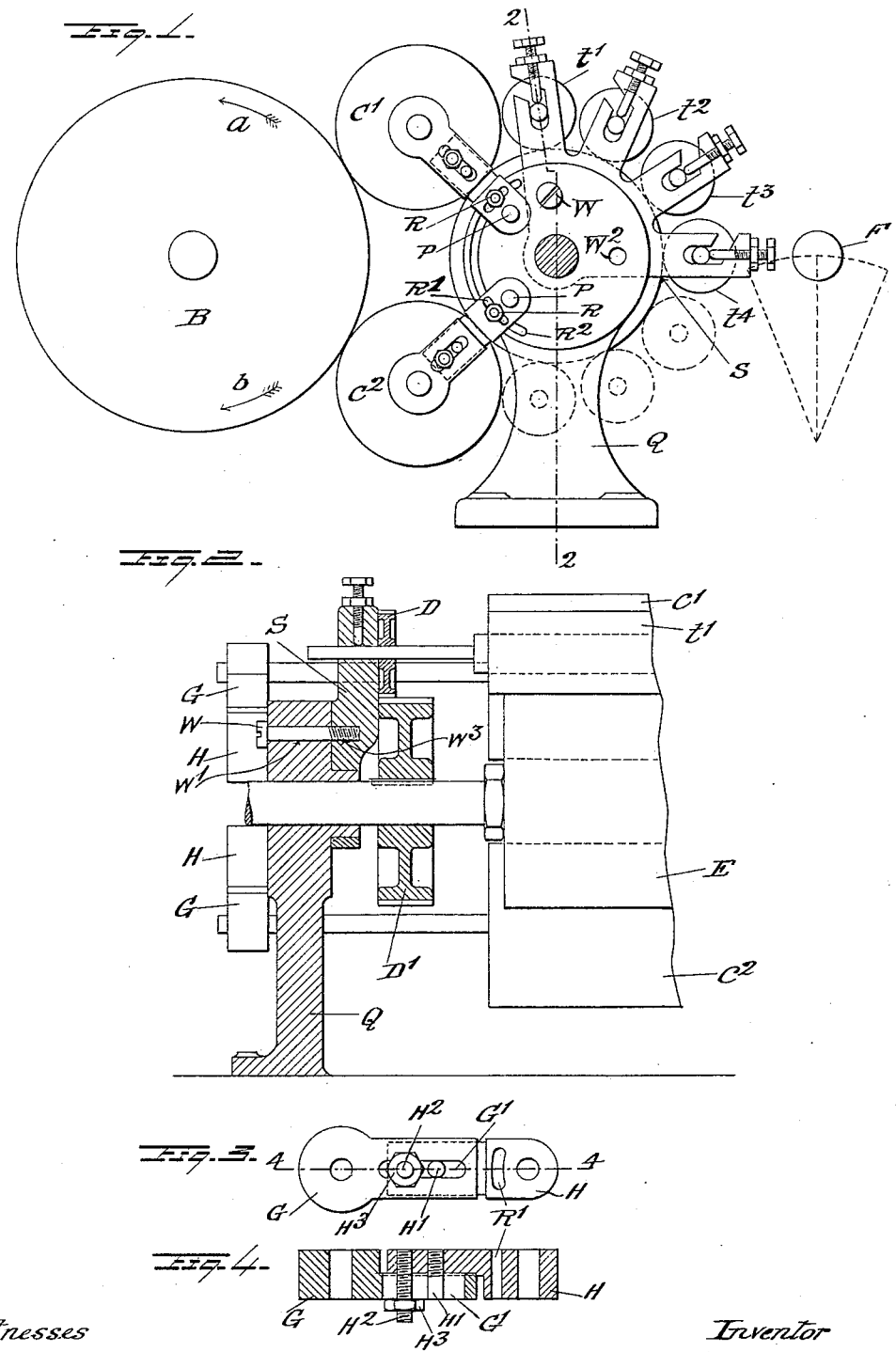

JULES MEYRUEIS, OF PARIS, FRANCE.

PRINTING-MACHINE.

SPECIFICATION forming part of Letters Patent No. 618,253, dated January 24, 1899.

Application filed December 7, 1896. Serial No. 614,826. (No model.)

*To all whom it may concern:*

Be it known that I, JULES MEYRUEIS, a citizen of the French Republic, and a resident of Paris, France, have invented certain new and useful Improvements in Inking Devices for Printing-Machines, (for which I have obtained a patent in England, No. 24,277, dated October 30, 1896,) of which the following is a specification.

The present invention relates to the construction permitting adjustment and reversal of the inking-train.

In the annexed drawings, Figure 1 is a side elevation of the reversible inking-train. Fig. 2 is a section on line 2 2, Fig. 1. Fig. 3 is a side elevation, on a larger scale, of part of the mechanism shown in Fig. 1; and Fig. 4 is a section thereof on line 4 4 of Fig. 3.

When reversing the direction of revolution of the printing-cylinder B, it is desirable to adjust the inking-train so as to properly spread the ink upon the table E before the latter comes into contact with the rollers $C'$ $C^2$, which distribute it on the printing-cylinder B. I may obtain this result by placing the ink-distributing rollers $t'$ $t^2$ $t^3$ $t^4$ in a bracket-frame S, turning on the axle of table E. When the cylinder B turns in the direction of the arrow $a$, the distributing-rollers are in the position indicated in full lines $t'$ $t^2$ $t^3$ $t^4$. The ink received by roller $t^4$ from the ductor-roller F is distributed by them upon the table E before coming into contact with the roller $C'$.

When the direction of rotation of printing-cylinder B is reversed so that it turns according to the arrow $b$, the distributing-rollers are brought into the position shown in dotted lines by turning the support S round the axle of table E, the roller $t'$ takes the place of the roller $t^4$ and receives the ink from the ductor-roll F, and the rollers $t^2$ $t^3$ $t^4$ are beneath the level of the axle of table E. The ink is thus also distributed before contact with the roller $C^2$.

On changing the printing-cylinder B for others of different diameters in order to vary the size of the printed paper it is necessary that the ink-transferring rollers $C'$ $C^2$ are always in contact with the table E and the cylinder B, and it is desirable to have means for varying their position. I obtain this result, first, by forming the supports of these rollers $C'$ $C^2$ of two levers, each composed of two pieces G H, sliding one upon the other, giving consequently a variable length. The one part G has a slot $G'$, and the other part H carries a guide-pin $H'$ and a threaded pin $H^2$, on which a nut $H^3$ may be screwed, and, second, by fixing these levers upon the support Q of the table E by means of a fixed pivot P and a bolt R in slots $R'$ $R^2$, allowing of displacing the rollers $C'$ $C^2$ tangentially to the table E.

When using printing-cylinders of lithographic stone, the ink-distributing rollers $t'$ $t^2$ $t^3$ $t^4$ are no longer of gelatin, but of steel covered with leather, as in lithographic machines. Each of these small rollers is provided with a gearing-wheel D, and they all receive movement from a gear-wheel $D'$, keyed upon the axle of the table E upon which they all roll.

This apparatus is applicable in multiple-cylinder printing-machines which may be used as perfecting or color-printing machines—that is to say, may print on both sides of the web or twice or more on one side—and in which it is consequently neccessary to be able to revolve each printing-cylinder sometimes in the one direction and sometimes in the other direction, according to the direction in which the web travels through the machine.

To hold the bracket S in place in each of its two positions, a screw-bolt W may be passed through one or other of the two holes $W'$ $W^2$ in the standard Q and engage in a screw-threaded hole $W^3$ in the bracket S.

I claim as my invention in printing-machines—

1. A reversible inking-train comprising the combination with a cylindrical table E and a ductor-roll movable in a direction to and from said table of a series of distributing-rollers $t'$, $t^2$, $t^3$, $t^4$, and an adjustable support for carrying the axles of said rollers, the said support being adapted for bringing either end roller into coöperation with the ductor-roll substantially as set forth.

2. A reversible inking-train comprising the combination with a cylindrical table E and a ductor-roll movable in a direction to and from said table of a series of distributing-rollers $t'$, $t^2$, $t^3$, $t^4$, and a bracket-frame S carrying the axles of said rollers the said frame S being journaled at the axis of table E and adapted to be oscillated on its axis for the purpose of bringing either end roller into coöperation with the ductor-roll for the purpose set forth.

3. A reversible inking-train comprising the combination with a cylindrical table E and a ductor-roll movable in a direction to and from said table, of a series of distributing-rollers $t'$, $t^2$, $t^3$, $t^4$, a bracket-frame S carrying the axles of said rollers the said frame being journaled at the axis of table E, and adapted to be oscillated on its axis for the purpose of bringing either end roller into coöperation with the ductor-roll, printing-cylinder B, rollers $C'$, $C^2$, having contact with the printing-cylinder and the table E, longitudinally extensible couples of plates G, H, carrying the axles of rollers $C'$, $C^2$, said plates G pivoted eccentrically of table E and means for adjusting the angular position of said plates.

In witness whereof I have signed this specification in presence of two witnesses.

JULES MEYRUEIS.

Witnesses:
A. J. HADDAN,
CHAS. ROCHE.